United States Patent
Patt

[15] 3,685,917
[45] Aug. 22, 1972

[54] BORING AND FACING HEAD

[72] Inventor: Sylvester Patt, 34213 Lake Shore Blvd., Willoughby, Ohio 44094

[22] Filed: Nov. 12, 1970

[21] Appl. No.: 88,661

[52] U.S. Cl. .................................. 408/150, 408/178
[51] Int. Cl. ......................................... B23b 29/034
[58] Field of Search ............... 408/178, 150, 151, 173

[56] References Cited

UNITED STATES PATENTS

| 636,009 | 10/1899 | Smith | 408/178 X |
| 2,263,085 | 11/1941 | Guild | 408/178 X |
| 2,771,798 | 11/1956 | DeVlieg | 408/178 X |
| 2,812,672 | 11/1957 | Sainati et al. | 408/151 |

Primary Examiner—Francis S. Husar
Attorney—McNenny, Farrington, Pearne and Gordon

[57] ABSTRACT

An eccentrically adjustable boring and facing head having a tool or workholder carriage reciprocably mounted in a guideway on a body and positionable along the guideway by rotation of a calibrated adjustment dial on the body through a cam and follower carriage drive. The carriage drive includes a pair of opposed cam followers adjustable with respect to one another to eliminate backlash and to take up eventual mechanical wear in the drive. A micrometer screw stop, provided on the body, is adjustable in the direction of carriage travel and operates directly on the carriage to precisely position it independently of the drive for greater positional accuracy and for retaining a finish stop setting, determined only once, during a production run in which the separably operable adjustment dial and associated cam drive are manipulated to change the position of the carriage for rough finishing subsequent workpieces.

14 Claims, 3 Drawing Figures

PATENTED AUG 22 1972

3,685,917

INVENTOR.
SYLVESTER PATT
BY
McNENNY, FARRINGTON, PEARNE & GORDON
ATTORNEYS

BORING AND FACING HEAD

BACKGROUND OF THE INVENTION

This invention relates to improvements in tool holders of the type that support a boring bar or other instrument for operative adjustment in eccentric relation to the axis of revolution of a machine tool on which either the tool holder or workpiece rotates.

In particular, the apparatus pertains to the type of tool holder or head which provides a rotatable adjustment member or dial operable to move and position a tool holder carriage on a supporting body, adapted to be mounted on a machine tool in alignment with a spindle axis, along a radial path.

In the prior art, typically, motion of the adjustment member or dial is mechanically transmitted to the tool holder carriage causing the carriage to be positioned in accordance with the selected position of the adjustment member. Among the problems found in prior devices is the inherent inaccuracy of the various tool carriage adjustment mechanisms. In practice, dimensional variations in the manufactured mechanical components of the adjustment member and the associated tool carriage drive are generally difficult and costly to avoid. Typically, backlash or free play may exist in the carriage positioning mechanism between the adjustment member, through the associated drive, and the connection with the tool holder carriage. As a result, precise positioning of the tool holder carriage has been difficult to achieve by exclusive reference to the position of the adjustment dial.

In many instances, tool positioning had to be checked by trial and error methods whereby a workpiece was measured by a separate device or gauge after each tool pass or cut. A trial and error procedure is not excessively burdensome in lost time where only a single or very few workpieces are to be formed. By contrast, in production work where many identical articles or surfaces are to be produced the method is proportionately more time consuming. This results, normally, because once a workpiece is finished the tool carriage must be readjusted from its final or finish position when beginning a new workpiece since a piece usually is progressively cut in a series of tool passes.

SUMMARY OF THE INVENTION

In accordance with one aspect of the invention, a boring and facing head is provided with a tool carriage drive which eliminates a major source of positional error found in prior devices. The invention eliminates free play or backlash in the adjustment dial and carriage drive to substantially improve positional accuracy of the head. The carriage drive includes a pair of opposed cam surfaces and a cooperating pair of cam follower surfaces. The follower surfaces may be adjusted relative to one another during the final assembly of the head to eliminate lost motion between the cam and follower surfaces. The cam follower surfaces are provided in the form of rollers which reduce frictional resistance and mechanical wear by virtue of their rolling contact with associated cam surfaces. Moreover, adjustment of the follower surfaces may be made at any subsequent time to take up for eventual wear.

The absence of free play or backlash in the carriage drive substantially improves the positional accuracy and repeatability of the boring and facing head. Positioning of the tool carriage through the adjustment dial is therefore sufficiently accurate for noncritical or intermediate forming steps or tool passes.

The adjustment dial has associated with it a graduated outer surface indicating the displacement of the carriage holder in a magnified scale. The carriage drive cam surfaces are arranged to cause the displacement of the carriage to be in direct proportion to the angular movement of the adjustment dial so that the reference scale associated with the adjustment dial is linear and, therefore, easily used. Further, the reference scale is laid out in less than half of the circumference of the adjustment dial so that the operator may quickly observe which direction the dial should be turned to obtain a desired displacement of the tool and so that the operator is not confused by a circularly repeating scale or a scale not in complete view.

Another important aspect of the invention relates to an adjustable carriage stop which is operable to precisely locate the carriage independently of the positional errors of the adjustment dial and carriage drive. The carriage stop operates directly on the tool carriage block for maximum accuracy. The stop is provided in the form of a micrometer screw having a calibrated scale associated with it to facilitate its adjustment.

In production work the micrometer stop may be precisely set in accordance with trial and error measurements while forming the first surface or workpiece. Once having been thus set, the micrometer stop may be left in place even while the tool holder carriage is repositioned by the carriage drive for making preliminary forming passes on subsequent surfaces or workpieces. Since the micrometer stop is left undisturbed, the carriage is readily repositioned to the previously determined final location by simply positioning it against the stop.

The carriage drive is arranged with a relatively low mechanical advantage to avoid positional variations when using the drive in conjunction with the micrometer stop which might otherwise result from differences in the adjusting force applied to the adjusting dial. In addition, a carriage locking means is designed to apply locking forces to the carriage in a manner which does not load or strain the micrometer stop and, thus, avoids a further source of error in locating the tool carriage.

Although referred to as a tool holder and designed primarily for that purpose, the same structure embodying the invention may be used as a workholder to support a workpiece on the carriage eccentrically to the holder axis.

DESCRIPTION OF THE PREFERRED EMBODIMENT

Figure 1:
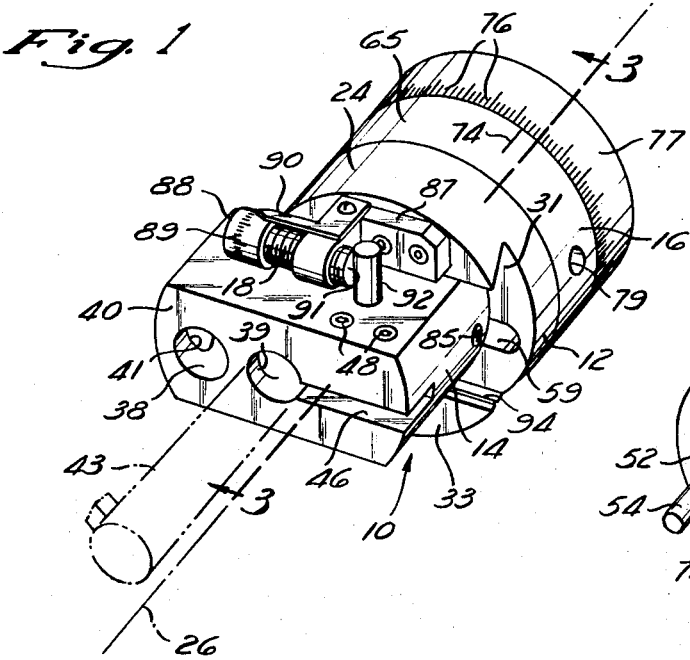
FIG. 1 is a perspective view of a boring and facing head embodying the present invention.

A boring and facing head 10 constructed in accordance with the invention comprises, as its principal parts, a supporting base or body 12, a tool holder carriage 14, an adjustment dial 16, and a micrometer screw stop 18. The body 12 is adapted, by means of an integral stem or shank 21, to be mounted on a rotary machine tool. The remainder of the parts of the head 10 are, in turn, supported directly or indirectly on the body 12. The tool holder carriage 14 reciprocates in a guideway on the body 12 when the adjustment dial 16, rotatably mounted on the body, is turned with respect to the body to adjustably position a boring bar or other tool on the carriage in eccentric relation to the body.

The body 12 is a circular member generally comprising three stepped cylindrical portions including the shank 21, a partially threaded intermediate hub portion 23, and an outer end 24 defining the minor, intermediate, and major diameters of the body respectively. Each of these cylindrical portions 21, 23 and 24 is concentric with a longitudinal axis 26 of the head 10. A longitudinal flat 28 is formed along the cylindrical shank 21 for locking the shank against rotation in a mating bore or other receptacle of a machine tool (not shown). In a normal situation, the head 12 may be mounted on and in axial alignment with the rotating spindle of a machine tool so that a tool mounted thereon will rotationally traverse a workpiece held stationary on the bed or table of the machine. Of course, the head 10 may be employed in other situations such as where the workpiece is rotated and the head 10 is held stationary.

A diametral dovetail groove 31 is cut in an outer face 33 of the outer end 24 of the body to form a guideway for the tool holder carriage 14. The tool holder carriage 14 is a roughly rectangular block having a length equal to the diameter of the major or outer end 24 of the body 12. A dovetail tenon 36 is formed along the inner side of the tool holder carriage 14 to provide beveled surfaces 37 for sliding engagement with the dovetail groove 31.

A pair of tool receiving holes, 38 and 39 adapted to hold elements such as a boring bar or tool or workpiece in parallel relation to the axis 26 of the head, are drilled in an outer side 40 of the tool holder carriage 14. An additional tool or element receiving hole 41, extending radially outward with respect to the axis 26 of the head, is provided in the leftward end, as viewed in FIG. 1, of the tool holder carriage 14. The tool receiving holes 38, 39 and 41 are each provided to extend the range of bore sizes which the head 10 can be used for forming and to provide convenient tool mounting arrangements.

A boring bar 43, illustrated in phantom, shows a typical mounting arrangement in one tool receiving hole 39. Set screws 42 (only one being shown) in the lower side of the tool holder carriage 14 secure boring bars or tools in the tool receiving holes 38, 39 and 41. A longitudinal slot 46, extending radially with respect to the head axis 26, is also formed in the outer side 40 of the tool holder carriage 14. The slot 46 is adapted to receive, at any point along its length, flat tool bits or elements (not shown) for spot facing and other types of facing or forming work. A tool or bit may be secured in the radial slot 46 by tightening a pair of associated set screws 48.

Figure 3:
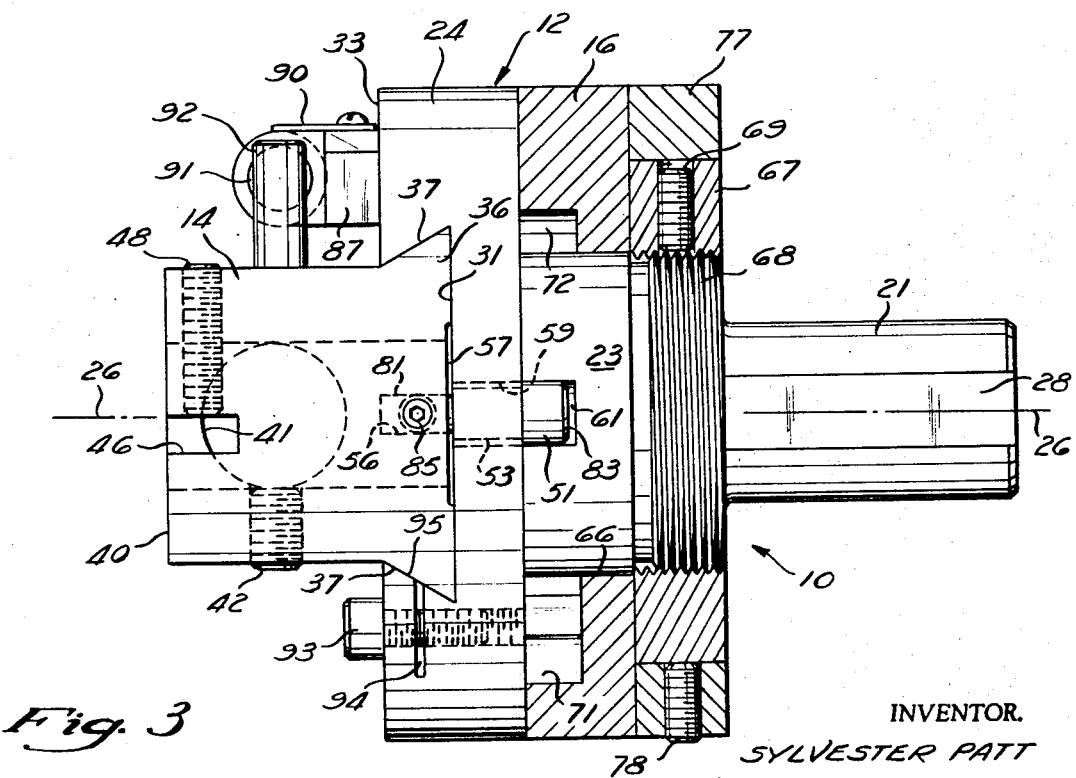
FIG. 3 is a longitudinal side view of the boring and facing head partially in cross section along the axial line 3—3 indicated in FIG. 1.

The tool holder carriage 14 is operably connected with the adjustment dial 16 through a pair of cam followers 51 and 52. The cam followers or cylindrical rollers 51 and 52 are rotatably supported on associated studs 53 and 54, respectively, which are in turn secured in diametrically separated holes 56 (only one being shown in FIG. 3) in the inner side 57 of the tool holder carriage 14. The studs 53 and 54 project and operate through radially elongated slot 59 through the outer end 24 of the body 12. A semicylindrical recess 61 is provided in each side of the intermediate cylindrical portion 23 of the body 12 to receive the cam followers 51 and 52 in the extreme positions of the tool holder carriage 14.

Figure 2:
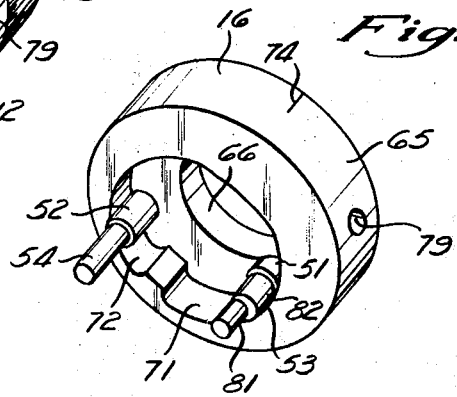
FIG. 2 illustrates the adjustment dial and associated cam and follower surfaces, alone, in the same perspective as FIG. 1.

The adjustment dial 16 is shown most clearly in FIG. 2. The adjustment dial 16 is annular in shape and is formed with an outer surface 65 substantially equal in diameter to the diameter of the outer end 24 of the body 12. Concentric with the outer surface 65 is a cylindrical inner bore 66 extending axially through approximately one half of the length of the adjustment dial 16. The bore 66 of the dial 16 is closely fitted in size to the diameter of the intermediate portion 23 of the body so that the adjustment dial 16 is rotatable on the intermediate portion 23 with neither excessive interference nor free play. The adjustment dial 16 is positioned on the intermediate cylindrical portion 23 of the body and releasably retained thereon by an annular nut 67. The nut 67 is threaded onto a threaded portion 68 of the intermediate part 23 of the body until the adjustment dial 16 is closely held against the outer end 24 of the body. The nut 67 is then locked in place on the threaded portion 68 by tightening a set screw 69.

The adjustment dial 16 includes diametrically opposed internal cam surfaces 71 and 72 engageable with the cam followers 51 and 52 respectively. The cam surfaces 71 and 72 and the cam followers 51 and 52 drive the tool holder carriage 14 when the adjustment dial 16 is rotated. Each of the internal cam surfaces 71 and 72 extends through an angle of about 156° or roughly through half of the inner circumference of the dial 16. Each of the cam surfaces 71 and 72 is developed to convert angular motion of the dial 16 to rectilinear movement of the tool holder carriage 14 in the diametral groove or guideway 31 in direct proportion to the amount of angular movement of the dial. That is, the displacement of the tool holder carriage 14 is directly proportional to the angular displacement of the adjustment dial 16.

A reference mark 74 is provided on the cylindrical outer surface 65 of the adjustment dial 16 for cooperation with adjacent graduations of a reference scale 76 on the outer periphery of an annular scale ring 77. The scale ring 77 is rotatable on the nut 67 for the purposes of zeroing in its reference scale 76 at a given angular position of the cooperating reference mark 74 on the adjustment dial 16. The scale ring 77 may be locked in a desired angular position relative to the body 12 by a set screw 78 adapted to engage the previously secured nut 67.

Eccentric displacement of the tool holder carriage 14 is magnified by movement of the reference mark 74 with the outer surface 65 of the adjustment ring 16. In one arrangement the adjustment dial 16 has an outer diameter of 4.5 inches and the maximum travel or eccentricity of the tool holder carriage 14 developed by the cam surfaces 71 and 72 is 0.78 inches. Motion of the tool holder carriage 14 is multiplied approximately eight times on the outer circumference of the adjustment dial 16. In this instance the reference marks on the scale 76 each represent 0.005 inches.

The reference scale 76 extends over the circumference of the scale ring 77 of an angle equal to that through which each cam surface 71 and 72 lies, approximately 156°. Thus, the boring and facing head 10 may be stopped or positioned where substantially the entire scale 76 may be observed. The operator is thus unlikely to be confused as to which direction to turn the adjustment dial 16. Further, the tool carriage 14 is quickly set to a desired position because less than a half turn of the adjustment dial 16 is required for a full change in position of the tool holder carriage 14 as defined by the cam surfaces 71 and 72. A socket hole 79 is provided in the outer surface 65 of the adjustment dial 16 to facilitate rotation of the dial by an operator with a pin or lever (not shown) inserted in the hole 79.

As shown in FIG. 2, the rightward cam follower stud 53 comprises a pair of cylindrical portions 81 and 82 eccentric to one another. This eccentric construction of the stud 53 permits its cam follower 51 to be moved relative to the opposite cam follower 52 by turning the stud 53 in its associated hole 56 in the tool holder carriage 14. The stud 53 may be turned, with the adjustment dial removed from the body 12, by means of a slot or socket in the unsupported end 83 of the stud 53 on which the cam follower 51 rotates.

The stud 53 is turned until the distance across the cam followers 51 and 52 equals or slightly exceeds the diametral distance between opposed areas of the cam surfaces 71 and 72. The stud 53 is then locked in position by tightening a set screw 85 threaded into the tool holder carriage 14 against the supported end or eccentric portion 81 of the stud 53. Rolling contact of the cam followers 51 and 52 against their associated cam surfaces 71 and 72 minimizes mechanical wear. In the event of any wear after extended use, the eccentric stud 53 may be repositioned to take up for any free play between these members.

The micrometer screw stop 18 is threaded into a bracket 87 rigidly fastened to the outer face 33 of the body 12. The axis of the micrometer screw stop 18 is parallel to the guideway 31 so that the micrometer screw stop is infinitely adjustable in a direction parallel to the direction of movement of the tool holder carriage 14. The head or adjusting knob 88 of the micrometer screw stop 18 is calibrated with a graduated reference scale 89. A pointer 90, secured to the stop bracket 87, extends over the reference scale 89 to gauge the position of the micrometer screw stop 18.

The divisions of the reference scale 89, preferably, represent increments of displacement of the tool holder carriage 14 somewhat smaller or finer than the divisions of the reference scale 76 associated with the adjustment dial 16. For instance, the divisions of the micrometer stop reference scale 89 may represent 0.001 inch while, as above, the divisions of the dial reference scale 76 may represent 0.005 inch. The tool holder carriage 14 engages an end 91 of the micrometer screw stop 18, directly through a fixed pin 92 rigidly secured to the carriage as by a press fit in a hole therein.

The adjustment dial 16 is used to move the tool holder carriage 14 into abutment with the micrometer stop 18. The scale magnification, as discussed above, provided by the adjustment dial 16 of approximately 8:1 equals the mechanical advantage or force multiplication between an adjustment force on the outer surface 65 of the dial and a force on the tool holder carriage 14 developed by the cam surfaces 71 and 72. Such a relatively low mechanical advantage insures that the micrometer stop 18 will not be significantly strained under reasonable adjusting forces. Positional errors due to variations in adjusting forces are thereby minimized.

Once the tool holder carriage 14 is positioned in a desired location with respect to the body 12, it may be locked on the body by tightening a pair of clamping screws 93 (only one being shown in FIG. 3) threaded into the outer end 24 of the body along the lower side of the dovetail groove 31. A longitudinal slot 94 is provided in the lower beveled surface of the dovetail groove 31 to permit the clamping screws 93 to pull an outer segment 95 of the dovetail groove 31 into tight locking engagement with an adjacent area of the beveled surface 37 on the lower side of the tool holder carriage 14. It may be seen that the clamping forces developed by the clamping screws 93 are not imparted against the micrometer screw stop or in the direction of movement of the tool holder carriage. The outer segment 95 of the dovetail groove 31 when tightened by the clamping screws 93 forces the tool holder carriage 14 axially towards the flat or vertical portion of the dovetail groove 31 and by a slight camming motion into tight engagement with the upper or opposite side of the dovetail groove.

From the foregoing structural description, one skilled in the art, it is believed, will readily comprehend the mode of use for which the boring and facing head of the invention is intended. In all types of work including accurate tooling and production work, a workpiece may be rough finished by simple and quick manipulation of the adjustment dial 16 and by reference to its associated scale 76. Final finishing may be accomplished by subsequent tool carriage adjustment using the more sensitive micrometer screw stop 18. A single or a series of incremental finishing tool passes may be made by setting the tool holder carriage 14 against the micrometer screw stop 18.

In production work where identical workpieces are required, the boring and facing head 10 of the invention has special advantage. A final or finishing position of the micrometer screw stop 18 may be determined, for instance, by systematically measuring a workpiece with a gauge after each stop adjustment and tool pass until a desired dimension is achieved. The micrometer screw stop 18 may thereafter be left at this trial determined position to eliminate tedious and time consuming repetitive measurement of subsequent workpieces. Once a workpiece is adequately rough finished, the tool holder carriage 14 is simply positioned against the micrometer screw stop 18 for a single final tool pass without reference to the adjustment dial scale 76.

It will be understood that the invention is not limited to the details of construction and arrangement of parts illustrated in the accompanying drawings and described above. It will also be understood that the phraseology or terminology employed above is for the purpose of description and not of limitation.

What is claimed is:

1. An adjustable head for holding elements such as tools and workpieces comprising a body defining an axis of the head and adapted to be mounted on a rotary machine tool with the head axis in parallel relation to an axis of rotation of the machine tool, guide surfaces on one end of said body defining a rectilinear guideway transverse to said axis, a holder carriage mounted on said body for reciprocation along a path defined by said guideway, tool attaching means on said holder carriage, a cam mounted on said body for rotation about said head axis and operable to drive said holder carriage along its path, opposing cam surfaces on said cam each defining a true position of said carriage along its path for a corresponding angular position of said cam relative to said body, a pair of opposed cam follower surfaces on said carriage engaging said opposed cam surfaces, and means for adjusting the position of one of said follower surfaces relative to the other to eliminate backlash between said cam and said holder carriage.

2. An adjustable head as set forth in claim 1, wherein said cam surfaces are arranged to drive said carriage along its path a distance directly proportional to the angular movement of said cam.

3. An adjustable head as set forth in claim 2, wherein said cam surfaces are arranged such that the distance travelled by said carriage is substantially less than the corresponding arcuate distance travelled by the outer circumference of said cam.

4. An adjustable head as set forth in claim 3, wherein a reference scale is provided at the periphery of said cam to indicate, with magnification of displacement, the actual transverse displacement of said holder carriage for a given rotational displacement of said cam.

5. An adjustment head as st forth in claim 1, wherein means are provided to lock said holder carriage in the position determined by said cam.

6. An adjustment head as set forth in claim 5, wherein said locking means engages a surface of said carriage directly.

7. An adjustable tool holder comprising a body having one end adapted to be mounted on a rotary machine tool, a tool holder block reciprocally mounted on an opposite end of said body, said tool holder block including means for mounting a tool thereon, guide surfaces on said opposite end of said body defining a rectilinear guideway, surfaces on said tool holder block engaging said guide surfaces, said guideway constraining said block to reciprocal motion along a path parallel to said guideway, drive means rotatable on said body and operable to move said block along said path, stop means adjustably supported on said body and operable to directly limit movement of said block produced by said drive means to a selected point along its path, and means to lock said tool holder at said selected point.

8. An adjustable tool holder as set forth in claim 7, wherein said stop means is infinitely adjustable in a direction parallel to the direction of said path.

9. An adjustable tool holder as set forth in claim 8, wherein said stop means includes a stop screw having its axis of rotation parallel to said path.

10. An adjustable tool holder as set forth in claim 9, wherein a reference scale is provided at the outer periphery of said stop screw to facilitate precise adjustment of said tool holder block relative to said body.

11. An adjustable tool holder as set forth in claim 7, wherein said locking means locks the tool holder block directly on said body without transmitting a locking force to said stop means.

12. An adjustable tool holder as set forth in claim 10, wherein said drive means includes a rotatable adjustment member having a reference scale at its circumference to indicate the movement of the tool holder block relative to said body, and the reference scale associated with said stop screw in substantially finer than the scale associated with said adjustment member.

13. An adjustable tool holder comprising a cylindrical body defining an axis of the holder and having a stem at one end adapted to be mounted on a rotary machine tool, said body having an outer face at its other end, a diametral guideway on said end face, a tool holder carriage mounted on said guideway for reciprocal movement thereon along a path transverse to said axis, tool attaching means on said tool holder carriage, said body having an intermediate cylindrical portion between said stem end and said outer face end, an annular adjustment dial, said adjustment dial having a central axial bore with a diameter substantially equal to the diameter of said intermediate portion of said body and being journaled on said intermediate portion, a retaining element releasably securing said adjustment dial on said intermediate portion against said other end of said body, said adjustment dial including a cam surface, cam follower means mounted on said tool holder carriage and extending axially through a slot in said other end of said body, said cam follower means engaging said cam surface of said adjustment dial, said cam surface having a configuration to cause a displacement of said tool holder carriage in said guideway proportional to an angular displacement of said adjustment dial, said adjustment dial having first graduated scale means associated with its outer periphery indicating eccentric displacement of said tool holder carriage, a micrometer screw stop mounted on said other end of said body, said micrometer screw stop being adjustably positionable in the path of said tool holder carriage to directly limit displacement of the carriage caused by rotation of said adjustment dial, second graduated scale means associated with said micrometer screw stop to facilitate final eccentric adjustment of said tool holder carriage without reference to said first graduated scale means.

14. An adjustable tool holder as set forth in claim 13, wherein said tool attaching means includes a slot extending longitudinally in an outer end of said tool holder carriage in a direction radial to said axis.

* * * * *

UNITED STATES PATENT OFFICE
CERTIFICATE OF CORRECTION

Patent No. 3,685,917          Dated August 22, 1972

Inventor(s) Sylvester Patt

It is certified that error appears in the above-identified patent and that said Letters Patent are hereby corrected as shown below:

Column 7, line 38, delete "adjustment" and substitute --adjustable--.

Column 7, line 38, delete "st" and substitute --set--.

Column 7, line 41, delete "adjustment" and substitute --adjustable--.

Column 8, line 18, delete "in" and substitute --is--.

Signed and sealed this 23rd day of January 1973.

(SEAL)
Attest:

EDWARD M. FLETCHER, JR.
Attesting Officer

ROBERT GOTTSCHALK
Commissioner of Patents